United States Patent [19]

Rollet

[11] Patent Number: 4,918,985
[45] Date of Patent: Apr. 24, 1990

[54] DYNAMIC BALANCING SYSTEM OVERCOMING AERODYNAMIC FORCES

[75] Inventor: Robert Rollet, La Roquette/Siagne, France

[73] Assignee: Aerospatiale Societe Nationale Industrielle, Paris, France

[21] Appl. No.: 295,490

[22] Filed: Jan. 10, 1989

[30] Foreign Application Priority Data

Jan. 12, 1988 [FR] France ............................ 88 00269

[51] Int. Cl.$^5$ ............................................ G01M 1/16
[52] U.S. Cl. .................................................... 73/471
[58] Field of Search .................. 73/66, 462, 471, 472, 73/474, 460

[56] References Cited

U.S. PATENT DOCUMENTS 4,532,803  8/1985  Wooley ............................... 73/471

FOREIGN PATENT DOCUMENTS 1248977  8/1967  Fed. Rep. of Germany .
1573598  11/1970  Fed. Rep. of Germany .
2241669  12/1977  Fed. Rep. of Germany .
1120431  7/1968  United Kingdom .

Primary Examiner—John Chapman
Attorney, Agent, or Firm—Pearne, Gordon, McCoy & Granger

[57] ABSTRACT

A dynamic balancing system has a chamber (21) which surrounds a rotating object (3) which is equipped with protruding objects and which chamber rotates around the same shaft in order to move the air (20) surrounding the object (3) and to reduce the aerodynamic forces. This has application to the balancing of artificial satellites.

6 Claims, 1 Drawing Sheet

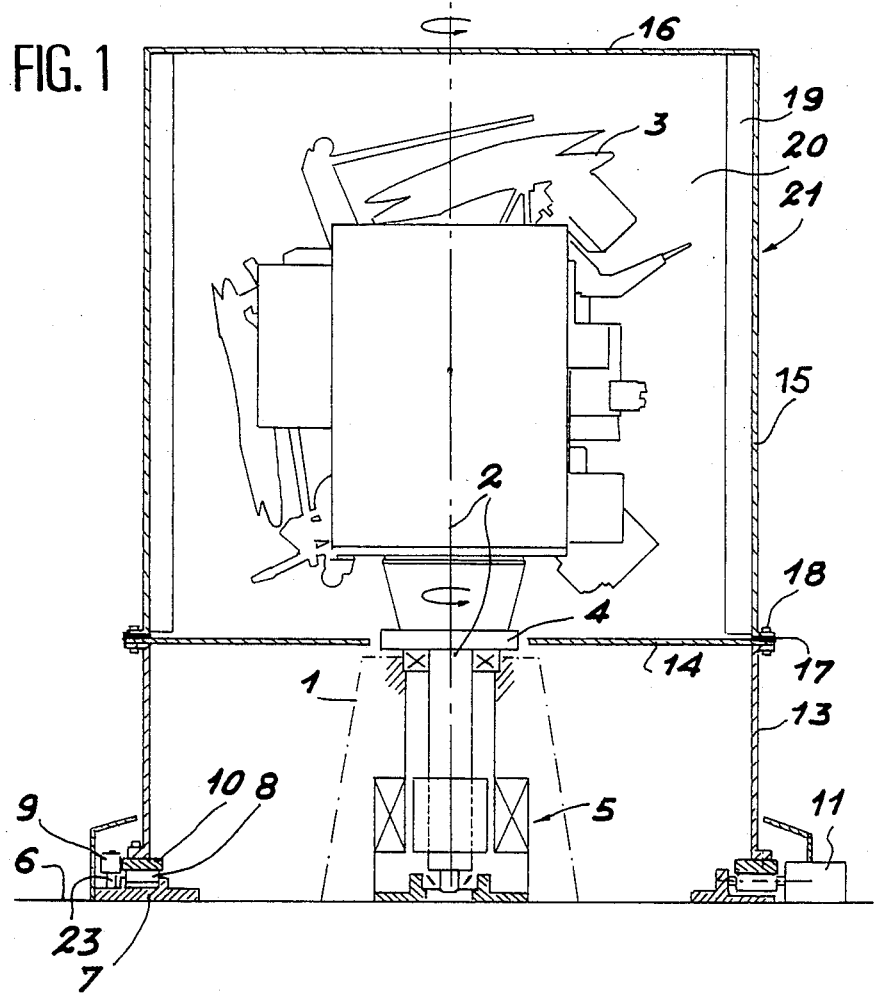
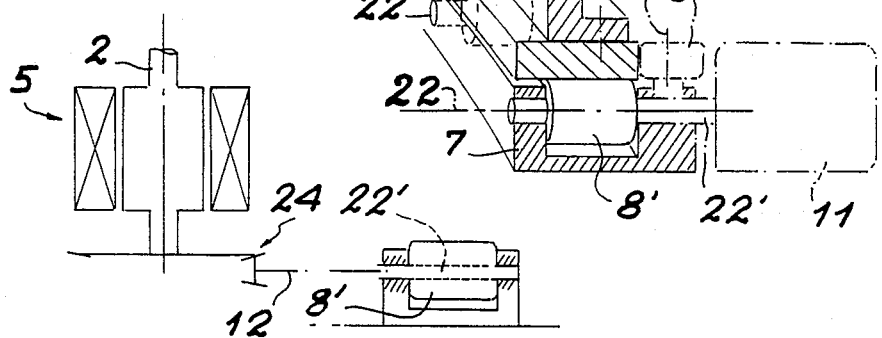

DYNAMIC BALANCING SYSTEM OVERCOMING AERODYNAMIC FORCES

BACKGROUND OF THE INVENTION

The subject of this invention is a system design to overcome the aerodynamic forces which are exerted on a non-symmetrical object rotating around a fixed axis, with the principal application of dynamic balancing of man-made satellites.

The dynamic balancing of an object in rotation around an axis consists of modifying the distribution of the masses within this object in order to either cancel out the alterating forces on the spokes of the shaft if it is in a fixed installation (electric motor, gyroscope, or turbine), or to make its rotation around the shaft free and stable (shaping machine satellite).

This modification in the distribution of masses is accomplished by reducing the amount of matter (electric motor, gyroscope) or adjustment of the balancing of masses (satellite).

An object is simple in its rotation around its axes of inertia. The purpose of dynamic balancing is to bring into synchronization a given axis of the object and one of the principal axes of inertia. Dynamic balancing has as a necessary corollary static balancing.

The definition of the characteristics of an object rotating around an axis is accomplished by means of a balancing machine consisting of a rotating shaft connected first, rigidly to an object where characteristics are to be defined, and secondly, through a force meter to an infinitely rigid and stable structure. The data generated by these meters make it possible to measure the forces generated by the object in rotation around an axis. These force readings, in association with the parameters for the angular and geometric speed of the object, make it possible to locate and to quantify the masses to be removed or to be adjusted on the object in order to balance it, that is, to overcome the forces measured by the balancing machine.

Since the forces generated by the rotating object are proportional to the square of the speed of rotation, the measure must be made at the maximum speed compatible with rigidity and the mechanical strength of the rotating object.

The dynamic balancing of satellites is a specific activity characterized by the use of a balancing machine with a vertical shaft, a low speed of rotation (30 to 60 revolutions/min) and considerable precision in measurement.

Current satellites are characterized by an exterior which carries numerous protruding objects (antennas, reflectors, power supplies) which create during rotation considerable aerodynamics forces which are taken into account by the balancing machine, but which are fictitious masses which falsify the measurements and therefore make correct balancing of these satellite extremely difficult.

The customary method for resolving this problem consists of performing the measurements in a vacuum, which requires a sealed chamber surrounding the balancing machine system and the satellite, and the installation of the necessary pumps.

SUMMARY OF THE INVENTION

This invention, which offers a solution to this problem, makes it possible to perform dynamic balancing of non-symmetrical satellites by setting the air in synchronous rotation by means of an enclosure with axial symmetry and an axis which is merged with the satellite axis of rotation with the object and turns in synchronization with it.

The system which is the subject of this invention therefore essentially consists of an enclosure surrounding the rotating object, and the enclosure turns concentrically to the fixed axis around which the object turns.

The enclosure may consist of a revolving structure connected to a mobile circular frame which rests on a fixed circular frame by means of rollers.

A device makes it possible to rotate this mobile frame in synchronization with the shaft of the balancing machine. The synchronization may be electric, by means of a servo motor, or mechanical, by means of a connection with the motor of the balancing machine.

The chamber may be equipped, to better advantage, with radial blades on its internal periphery which move the air in the enclosure which the chamber encloses.

The following description on the basis of the appended drawings, which is given as an example which is not limitative, will make it clearly understood how the invention may be implemented.

BRIEF DESCRIPTION OF THE DRAWING

FIG. 1 shows a general view of the invention and
FIGS. 2 and 3 show two detailed illustrations which are two different manners of execution.

DESCRIPTION OF THE PREFERRED EMBODIMENTS

FIG. 1, shows a balancing machine (1) with a vertical rotation shaft (2) driven by an electric motor (5) and an object to be balanced (3) installed on a platform (4). The balancing machine (1) is rigidly connected to the ground (6). A circular frame (7) which is connected rigidly to the ground (6) concentrically to the shaft (2) is equipped with a series of rollers (8) with horizontal and radial axes (22) and a series of rollers (9) with vertical axes (23) which are designed to maintain a mobile frame (10) in a position which is horizontal and concentric in relation to the shaft (2). The mobile frame (10) is driven in rotation by means of an electric servo motor (11) which drives at least one horizontal motor roller (8') whose axle (22') is the output shaft of the motor (11). The other horizontal rollers (8) are rollers which support the mobile frame (10). It is also possible to consider, as an alternative, the elimination of the motor (11) and the driving of the mobile frame (10) by means of a horizontal rod (12) connected to the motor (5) of the balancing machine (1) and to the vertical shaft (2) by means of a gear box with conical gear wheels (24) on the motor (5). The rod (12) is then coupled with the axle (22') of the motor roller (8'). FIGS. 2 and 3 show these two solutions more clearly.

Connected rigidly to the frame (10) is a cylinder (13) which is fitted with, at the level of the platform (4), a disk (14), which leaves, between its central opening and the edge of the platform (4), the minimum amount of play compatible with the proper operation of the system.

Resting on this disk (14), with the interposition of a gasket (17), is an upper cylinder (15) whose shaft is connected to the shaft (2) and whose top portion is sealed with a disk (16). The mechanical connection between the cylinders (13,15) and the disk (14) is accomplished by means of a series of bolts (18).

The cylinder (15) has on its internal periphery a series of blades (19), arranged vertically and radially, which are designed to move the air contained in the enclosure (20) which is enclosed by the items (14), (15), and (16), and which contains the satellite (3).

The setting in simultaneous and synchronized rotation of the satellite (3) and the chamber system (21), which is made up essentially of the upper cylinder (15), the disk (14) and the disk (16), results in the setting into rotation of the air contained in the enclosure (10), and therefore in the elimination of the relative speed between and the surrounding air and the corresponding aerodynamic forces.

A variant consists of having a fixed chamber with a smooth internal surface, that is, without the blades (19), and to rely solely on the satellite to rotate the air inside the enclosure (20). The chamber (21) is simply used to separate the external air from the air contained in the enclosure (20) by confining the latter.

I claim:

1. A system designed to eliminate the aerodynamic forces which are exerted on an object in rotation about a fixed axis, comprising first motive means, a shaft rotated by the first motive means about the axis and to which the object is fixed, the system comprising a chamber which encloses the object and is rotated about the fixed axis by second motive means, wherein the chamber has a circumferential wall provided with generally radial and vertical blades which extend inwardly from the wall.

2. The system according to claim 1, wherein the object and the chamber are rotated at about the same angular speed.

3. The system according to claim 1, wherein the chamber is connected to an upper circular frame which rests on rollers rotating in a lower circular frame, the second motive means driving one of the rollers.

4. The system according to claim 3, wherein the lower circular frame has rollers which rotate about axes perpendicular to the upper circular frame and maintain the upper circular frame concentric to the fixed axis.

5. The system according to claim 1, wherein the first and second motive means comprise one motor, first linking means comprising the shaft which joins the motor with the object and second linking means which joins the motor with the chamber.

6. A system designed to eliminate the aerodynamic forces which are exerted on an object in rotation about a fixed axis, comprising first motive means incorporating a first motor which rotates a shaft about the axis, the object being fixed to the shaft, a chamber which encloses the object, the second motive means incorporating a second motor which rotates the chamber about the axis at an angular speed which is close to an angular speed at which the object is rotated.

* * * * *

UNITED STATES PATENT AND TRADEMARK OFFICE
CERTIFICATE OF CORRECTION

PATENT NO.   :   4,918,985
DATED        :   April 24, 1990
INVENTOR(S)  :   Robert Rollet It is certified that error appears in the above-identified patent and that said Letters Patent is hereby corrected as shown below:

Column 1, line 14, delete "alterating" and insert --alternating--.

line 22, delete "simple" and insert --stable--.

line 53, delete "aerodynamics" and insert --aerodynamic--.

line 56, delete "satellite" and insert --satellites--.

line 68, after "rotation" insert --with the object--.

Column 2, line 1, delete "satellite" and insert --satellite's--.

line 2, after "rotation" delete --with the object--.

line 65, after "to" delete --the shaft--.

Signed and Sealed this

Thirteenth Day of August, 1991

Attest:

HARRY F. MANBECK, JR.

*Attesting Officer*  *Commissioner of Patents and Trademarks*